US006493248B2

(12) United States Patent
Bingley

(10) Patent No.: US 6,493,248 B2
(45) Date of Patent: Dec. 10, 2002

(54) RELATING TO INVERTERS

(76) Inventor: Donald Watson Bingley, 5 Rutland House, Whitehart Lane, Collier Row, Romford, Essex RM7 8LD (GB)

( * ) Notice: Subject to any disclaimer, the term of this patent is extended or adjusted under 35 U.S.C. 154(b) by 25 days.

(21) Appl. No.: 09/736,460

(22) Filed: Dec. 15, 2000

(65) Prior Publication Data

US 2001/0004324 A1 Jun. 21, 2001

(51) Int. Cl.$^7$ .............................................. H02M 7/537
(52) U.S. Cl. ...................................... 363/131; 363/132
(58) Field of Search ............................... 363/131, 132, 363/127, 40, 41, 43, 39

(56) References Cited

U.S. PATENT DOCUMENTS

| | | | | |
|---|---|---|---|---|
| 3,628,123 A | * | 12/1971 | Ross | 363/43 |
| 4,032,832 A | * | 6/1977 | Miller | 363/43 |
| 4,052,658 A | * | 10/1977 | Hucker | 363/43 |
| 4,063,144 A | * | 12/1977 | Hucker et al. | 363/43 |
| 4,106,089 A | * | 8/1978 | Fettinger | 363/153 |
| 4,159,513 A | * | 6/1979 | Gemp et al. | 363/43 |
| 5,041,957 A | * | 8/1991 | Dhyanchand et al. | 363/43 |
| 5,337,227 A | * | 8/1994 | Stacey et al. | 363/71 |
| 5,999,428 A | * | 12/1999 | Dahler et al. | 363/71 |

* cited by examiner

Primary Examiner—Rajnikant B. Patel

(57) ABSTRACT

An inverter charger, fed with d.c. from a battery, to supply a.c. to a load, comprising eight inverters stages which each provide an alternating step function output current and which are arranged in two sets of four, the inverter stages of each set being serially connected and driven sequentially to produce in combination, a generally sinusoidal step function waveform comprising fifteen degree steps, the two step function waveforms thus produced, one by each set, being serially combined, and mutually relatively phase controlled to produce a regulated sinusoidal output voltage for the load, wherein regulation is effected in dependence upon the relative phase between the two step function waveforms both for battery charging and for supply of power to the load, regulation being facilitated by the provision of 'dwell periods' in the output from each inverter stage.

3 Claims, 4 Drawing Sheets

FULL BRIDGE INVERTER

OUTPUT WAVEFORM

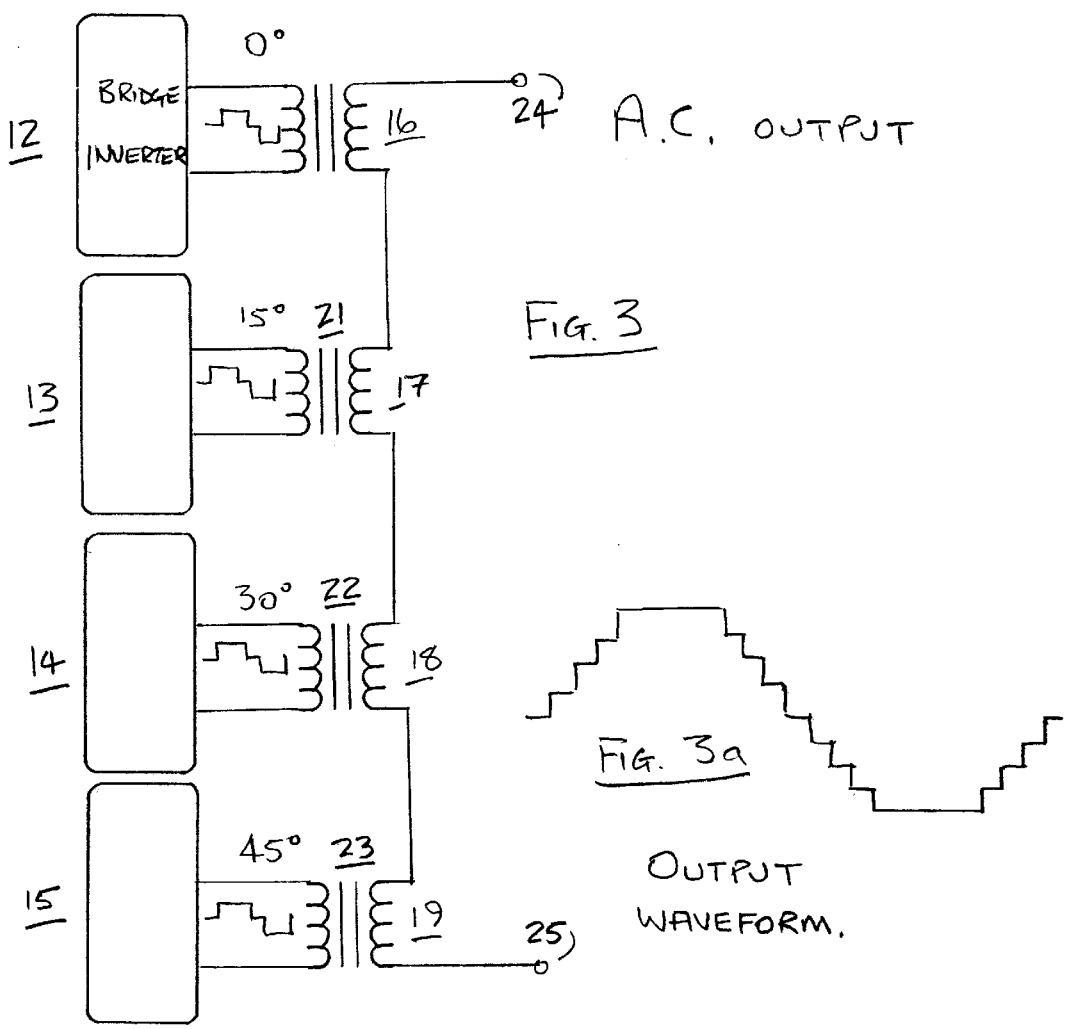

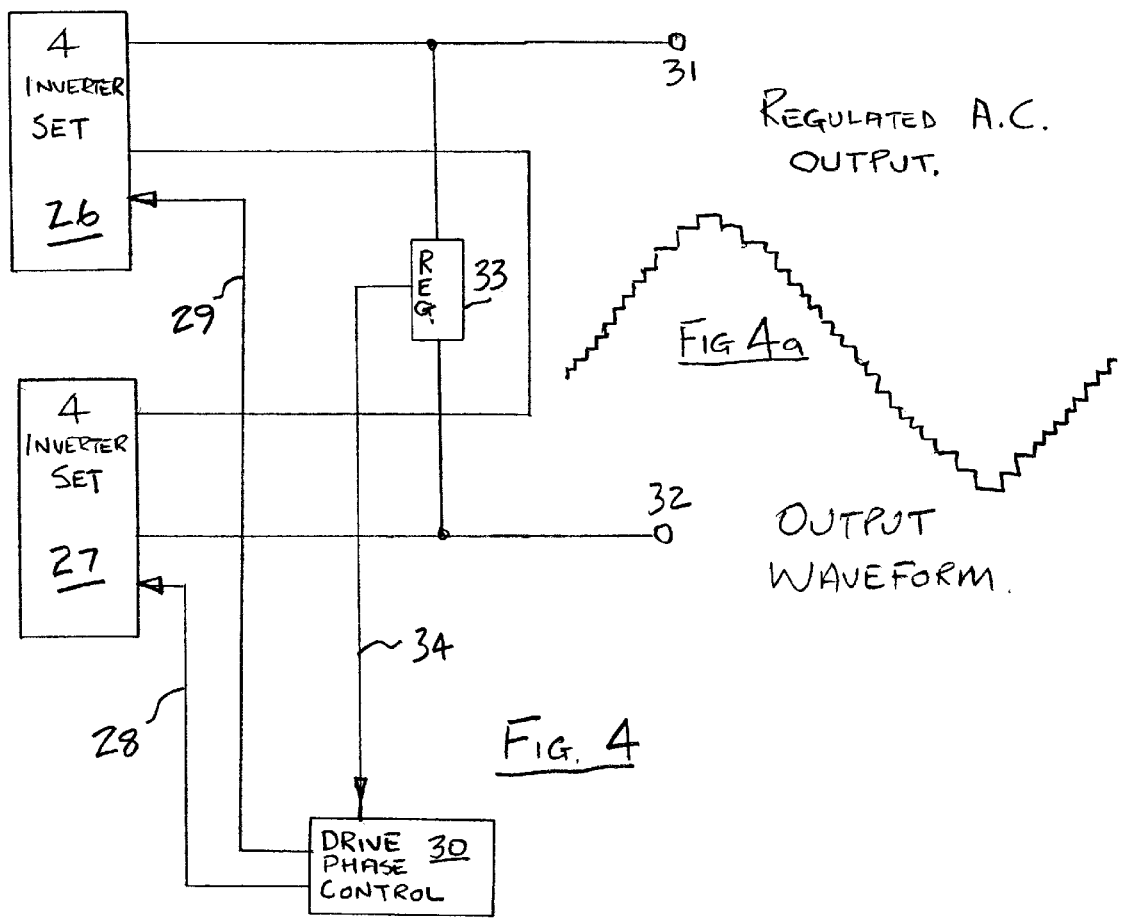

RELATING TO INVERTERS

BACKGROUND OF THE INVENTION

1. Field of the Invention

This invention relates to inverter chargers.

2. Description of the Related Art

Inverter chargers are generally well known and are used in the event of a utility supply failure, to provide continuity of supply for a load from a battery, and/or to provide a supplementary supply to cope with peak power requirements which exceed the capability of a supply generator, power from the utility or from the generator, as the case may be, being used to charge the battery. Inverter chargers may also be arranged to feed surplus energy back to the utility.

Inverter chargers comprise an inverter unit, which serves to provide a.c. for the load by converting d.c. from the battery, and control/switching apparatus for control of the supplementary/surplus power supply as required, and for providing current for charging the battery from the utility or generator.

The provision of a sinusoidal output voltage, similar to the waveform of an a.c. 50 hertz or 60 hertz utility supply, is highly desirable, since some loads, such as a.c. motors for example, operate inefficiently when fed from an a.c. source having a high harmonic content such as a square wave source. Also, provision for drawing a sinusoidal current from a 50 hertz or 60 hertz utility supply or generator is highly desirable for maximum utilization of generator power rating and most efficient usage of utility power when drawing power from the utility supply or generator to charge the battery, or when delivering surplus power from the inverter to the utility or when delivering supplementary power in support of the generator.

It will thus be appreciated that an inverter charger may be used as a part of standby power or emergency power supply apparatus wherein power for a load is provided via the inverter charger by the battery when the utility supply or generator, as the case may be, fails and wherein the battery is charged via the inverter charger from the generator or utility supply, during periods when it is available, and wherein some supplementary power for the load from the battery may also be provided in order satisfy peak load demand when this exceeds the capability of a generator having insufficient capacity to meet such demands.

Known inverter chargers capable of providing the functions as just before described, and having a sinusoidal output, tend to be expensive to fabricate and somewhat inefficient in operation due to the design of the inverter unit. In order to produce an inexpensive inverter charger, it is desirable to use one inverter both for battery charging purposes and to supply a load but with such arrangements regulation for both functions poses problems.

It is an important object of the present invention to provide an inverter charger wherein the shortcomings of such known apparatus are obviated, at least in part, and wherein regulation of both charging and load supply functions is facilitated.

Since the present invention is concerned more particularly with the provision of an inverter charger, control/switching apparatus as used in inverter chargers, and which may take any suitable form, will not be described herein in detail.

SUMMARY OF THE INVENTION

According to the present invention, an inverter charger comprises a single phase inverter unit having eight inverter stages arranged for connection to a common D.C source, which stages provide similar stepped alternating waveforms of substantially the same amplitude and waveshape, eight individual similar single phase two winding transformers, one primary winding provided on each of the said single phase transformers to which, respective ones of the said inverter stages are connected, one secondary winding provided on each of the said single phase transformers, two secondary winding sets, each of which sets comprises four of the said secondary windings connected in series, the secondary windings of each set being driven sequentially to produce in combination, a generally sinusoidal step function waveform comprising fifteen degree incremental steps, the two step function waveforms thus produced, one by each set, being serially combined, and mutually relatively phase controlled to produce a single phase sinusoidal output voltage for a load normally fed from a utility or generator supply so as to provide continuity of supply if the utility or generator supply fails, output voltage regulator means operative to regulate the said output voltage in dependence upon the relative phase between the said two step function waveforms, a battery for supplying d.c. to the said inverter unit, control means for controlling the supply of charging current fed from the utility or generator supply to the said battery and for controlling provision by the inverter of supplementary power when the capacity of the generator is inadequate, and switch means responsive to a control signal produced by the control means in dependence upon battery voltage to connect the inverter to the utility or generator so that controlled sinusoidal charging current is fed from the utility or generator back through the inverter to charge the battery, and wherein each of the said stages comprise, four transistor switches connected in bridge configuration across the said primary winding of one of the said transformers with which they are operatively associated, conductivity of the said transistor switches being controlled so as to produce dwell periods in the output voltage from each stage, whereby provision by the inverter of charging current in one direction or supplementary power in the other direction are both controllable.

It will be readily apparent that the relative phase of the two step-function waveforms, can be controlled manually, or automatically by appropriate operation of the drive circuit, thereby to effect the regulation.

By utilizing eight transformers in two sets of four, a regulated sinusoidal output voltage is provided and sinusoidal current is drawn from the utility or generator for regulated charging, efficiently and relatively economically as will hereinafter be explained. One embodiment of the invention will now be described with reference to the accompanying drawings.

BRIEF DESCRIPTION OF THE DRAWINGS

FIG. 1a, is a sinusoidal waveform as produced by the inverter charger of FIG. 1;

FIG. 3, is a block circuit diagram of a set of four serially connected full wave bridge inverters;

FIG. 3a, is a waveform as produced by the set of FIG. 3;

FIG. 4, is block diagram of an inverter unit comprising two sets as shown in FIG. 3, connected in series and, FIG. 4a, is a waveform as produced by the inverter unit of FIG. 4.

DESCRIPTION OF THE PREFERRED EMBODIMENTS

Figure 1:
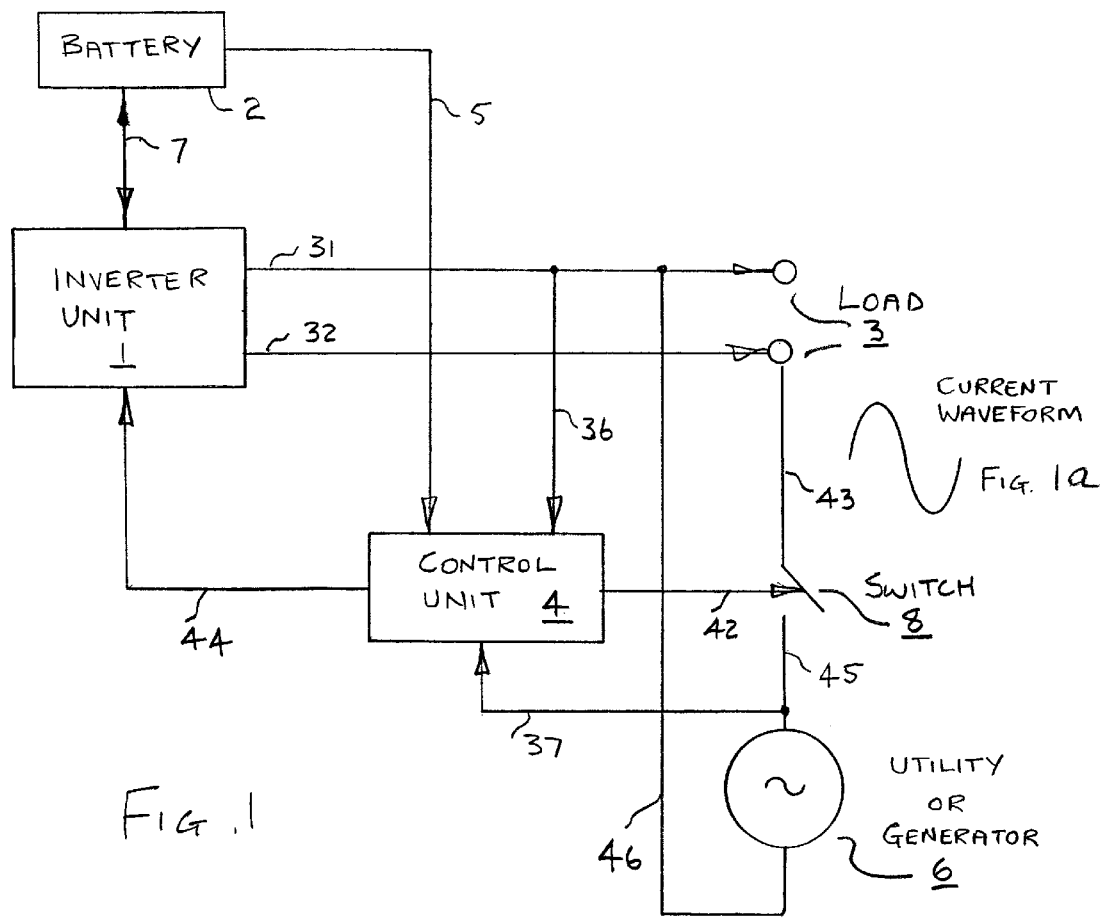
FIG. 1, is a block circuit diagram of an inverter charger.

Referring now to FIG. 1, an inverter charger comprises an inverter unit 1, which is fed with d.c. from a battery 2 via its positive and negative connections represented in FIG. 1 by a line 7, and which provides sinusoidal a.c. for a load (not shown) connected to load terminals 3. A control unit 4, is provided which senses battery voltage via a line 5, inverter voltage via a line 36 and utility or generator voltage via a line 37. In operation, the control unit 4, applies an appropriate control signal to the inverter unit 1, via a line 44, to control the a.c. voltage of the inverter unit 1, as sensed via the line 36, to compensate for battery voltage variation as sensed via a line 5, or load variations. The control unit 4, senses synchronisation of the inverter unit 1, via the line 36, with the utility or generator as sensed via the line 37, and when the battery 2 needs to be charged, or when the generator 6, needs the support of the inverter unit 1, a switch 8 (which may be a relay) is closed by means of a signal fed thereto on a line 42, thereby connecting the inverter unit 1, to the utility or generator 6, as the case may be, so that the battery 2, is charged from the inverter unit 1, via the line 7, or so that the inverter unit 1 operates to provide the required support. However, the control unit 4, which may be fabricated using known control circuitry by those skilled in the art, is not central to the present invention and so it will not be further described in detail herein.

Figure 2:
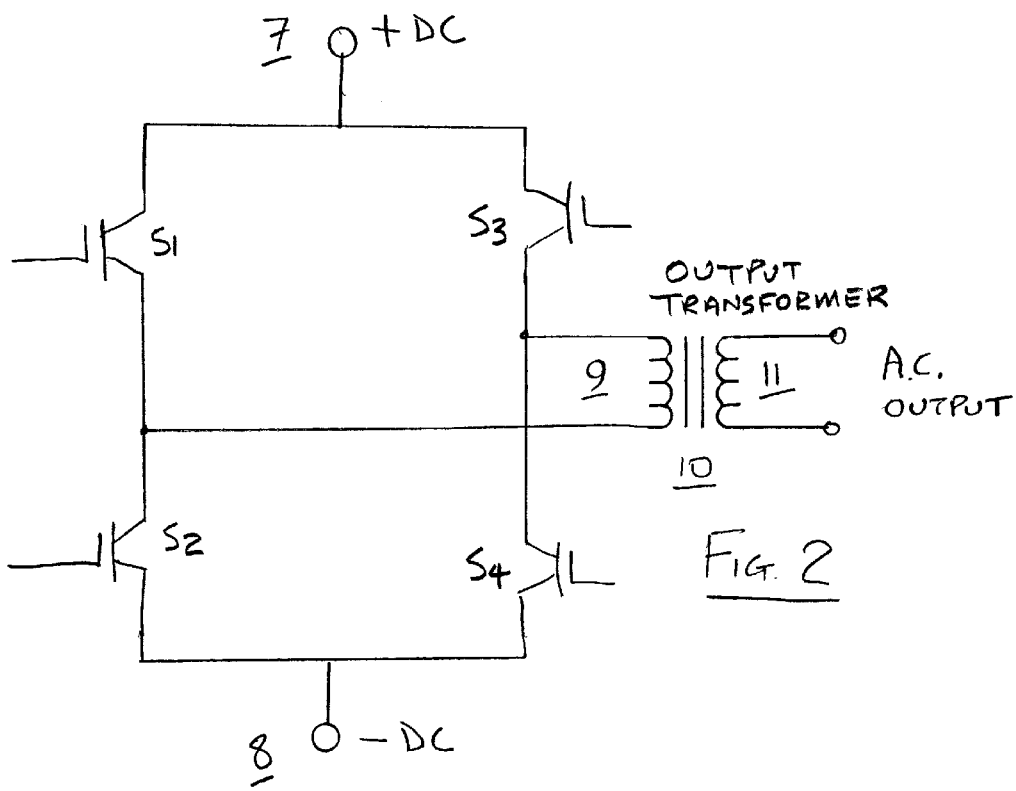
FIG. 2, is a circuit diagram of a full wave bridge inverter.
Figure 2A:
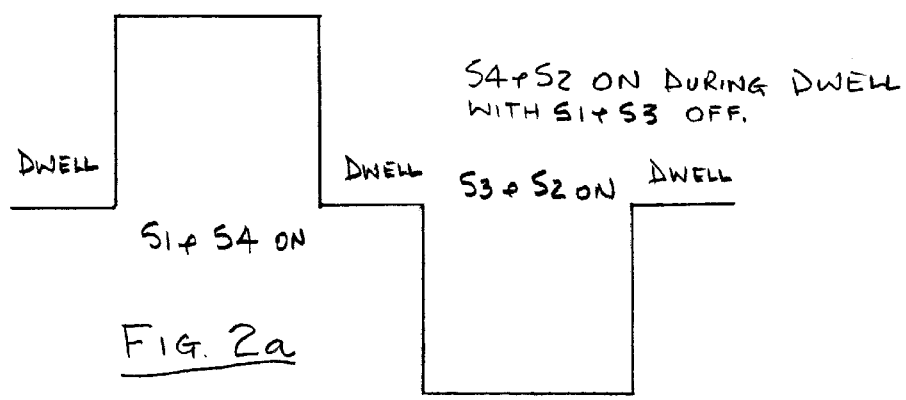
FIG. 2a, is a waveform as produced by the bridge inverter of FIG. 2.

The inverter unit 1, comprises eight full wave bridge inverters, one of which is shown in FIG. 2. Referring now to FIG. 2, the full wave bridge inverter comprises four transistor switches S1, S2, S3, S4, the operation of which are arranged to produce a waveform as shown in FIG. 2a, which transistor switches are connected in bridge configuration across a d.c. supply on terminals 7, 8, to feed the primary winding 9, of a transformer 10, so as to provide the pulsed output waveform, as shown in FIG. 2a, at the secondary winding 11, of the transformer 10.

As shown in FIG. 3, four bridge inverters 12, 13, 14, 15, each of which is as shown in FIG. 2, are interconnected so that secondary windings 16, 17, 18, 19, of their respective transformers 20, 21, 22, 23, are coupled in series, the switches S1, S2, S3, S4, of each bridge inverter being driven so to produce a generally sinusoidal output waveform from the set at terminals 24, 25, as shown in FIG. 3a, which output waveform comprises steps in 15 degree increments.

As shown in FIG. 4, two sets 26, 27, each as shown in FIG. 3, are serially coupled, the inverters of each set being driven via lines 28, 29, by a drive phase control unit 30, which serves to control the relative phase of the waveforms forms produced by each of the sets 26, 27, and thus the output voltage of the inverter unit on terminals 31, 32. In order to facilitate automatic regulation of the output voltage on terminals 31, 32, the voltage across them is sensed in regulator sensor 33, and a control feedback signal provided on a line 34, which serves to effect appropriate phase control.

Since an inverter according to this invention uses eight similar small transformers in two sets of four, economies of scale are enjoyed and the provision of a sinusoidal output is simply facilitated.

What is claimed is:

1. A single phase inverter unit comprising eight inverter stages arranged for connection to a common D.C source, which stages provide similar stepped alternating waveforms of substantially the same amplitude and waveshape, eight individual similar single phase two winding transformers, one primary winding provided on each of the said single phase transformers to which, respective ones of the said inverter stages are connected, one secondary winding provided on each of the said single phase transformers, two secondary winding sets, each of which sets comprises four of the said secondary windings connected in series, the secondary windings of each set being driven sequentially to produce in combination, a generally sinusoidal step function waveform comprising fifteen degree incremental steps, the two step function waveforms thus produced, one by each set, being serially combined, and mutually relatively phase controlled to produce a single phase sinusoidal output voltage.

2. An inverter charger comprising a single phase inverter unit having eight inverter stages arranged for connection to a common D.C source, which stages provide similar stepped alternating waveforms of substantially the same amplitude and waveshape, eight individual similar single phase two winding transformers, one primary winding provided on each of the said single phase transformers to which, respective ones of the said inverter stages are connected, one secondary winding provided on each of the said single phase transformers, two secondary winding sets, each of which sets comprises four of the said secondary windings connected in series, the secondary windings of each set being driven sequentially to produce in combination, a generally sinusoidal step function waveform comprising fifteen degree incremental steps, the two step function waveforms thus produced, one by each set, being serially combined, and mutually relatively phase controlled to produce a single phase sinusoidal output voltage for a load normally fed from a utility or generator supply so as to provide continuity of supply if the utility or generator supply fails, output voltage regulator means operative to regulate the said output voltage in dependence upon the relative phase between the said two step function waveforms; a battery for supplying d.c. to the said inverter unit, control means for controlling the supply of charging current fed from the utility or generator supply to the said battery and for controlling provision by the inverter of supplementary power when the capacity of the generator is inadequate, and switch means responsive to a control signal produced by the control means in dependence upon battery voltage to connect the inverter to the utility or generator so that controlled sinusoidal charging current is fed from the utility or generator back through the inverter to charge the battery, and wherein each of the said stages comprise, four transistor switches connected in bridge configuration across the said primary winding of one of the said transformers with which they are operatively associated, conductivity of the said transistor switches being controlled so as to produce dwell periods in the output voltage from each stage, whereby provision by the inverter of charging current in one direction or supplementary power in the other direction are both controllable.

3. An inverter charger as claimed in claim 2, wherein the four transistor switches of each stage comprise first, second, third and fourth switches, the first and second of which comprise a first serially connected pair and the third and fourth of which comprise a second serially connected pair, the said pairs being connected across the said common DC source with the said primary winding of that one of the transformers with which they are operatively associated being connected across junctions between transistor switches of each pair, and wherein conductivity of the second and fourth switches is effected whilst the first and third switches remain non-conductive so as to produce the said dwell periods between successive pulses of opposite sense, which pulses comprise pulses of one sense produced when the first and fourth switches only are arranged to conduct, and pulses of the opposite sense produced when the second and third switches only are arranged to conduct.

* * * * *